Sept. 28, 1943. H. E. WICHNER 2,330,769
DUST FOR AIR CONDITIONING SYSTEMS
Filed Sept. 3, 1941 3 Sheets-Sheet 1
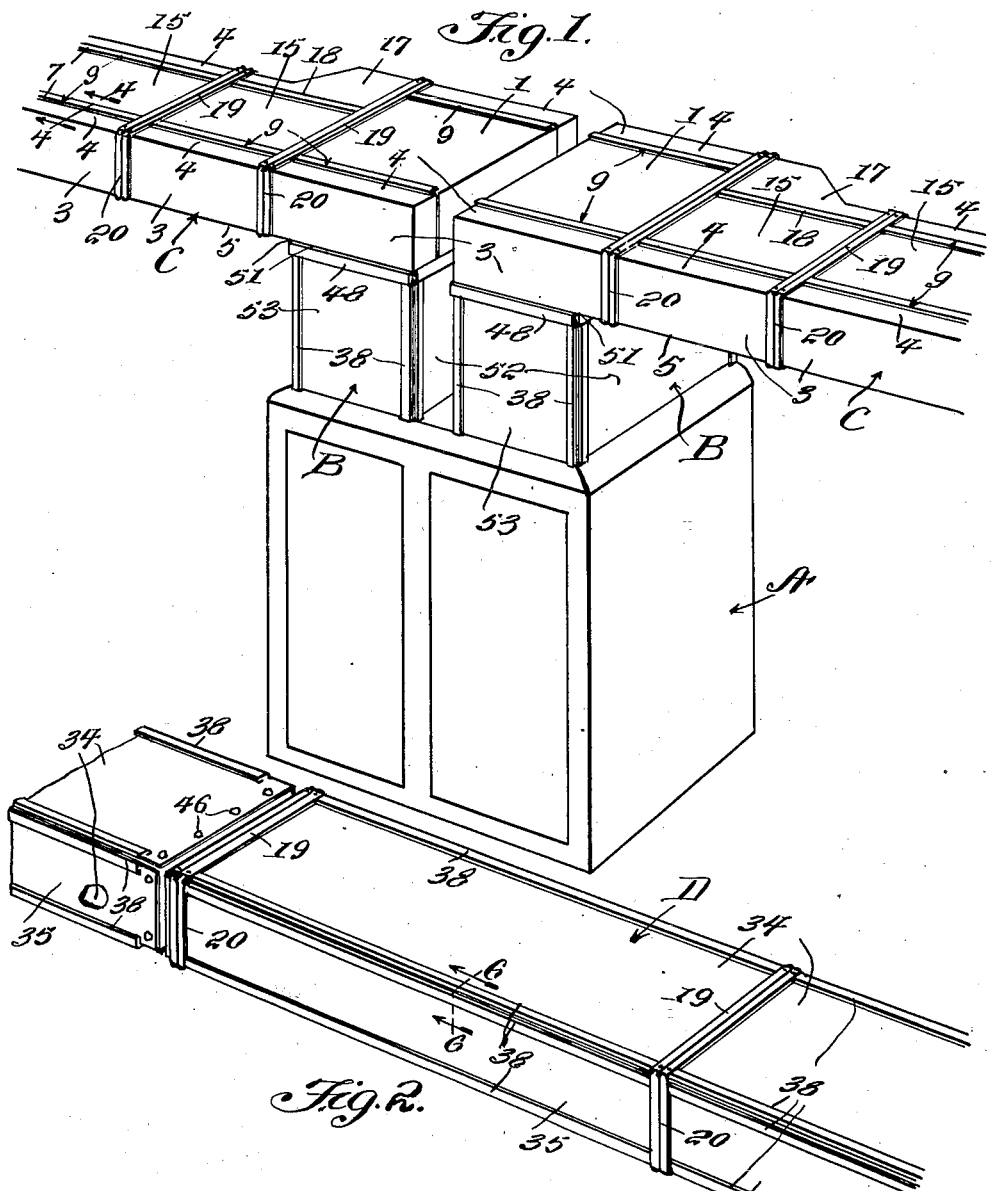

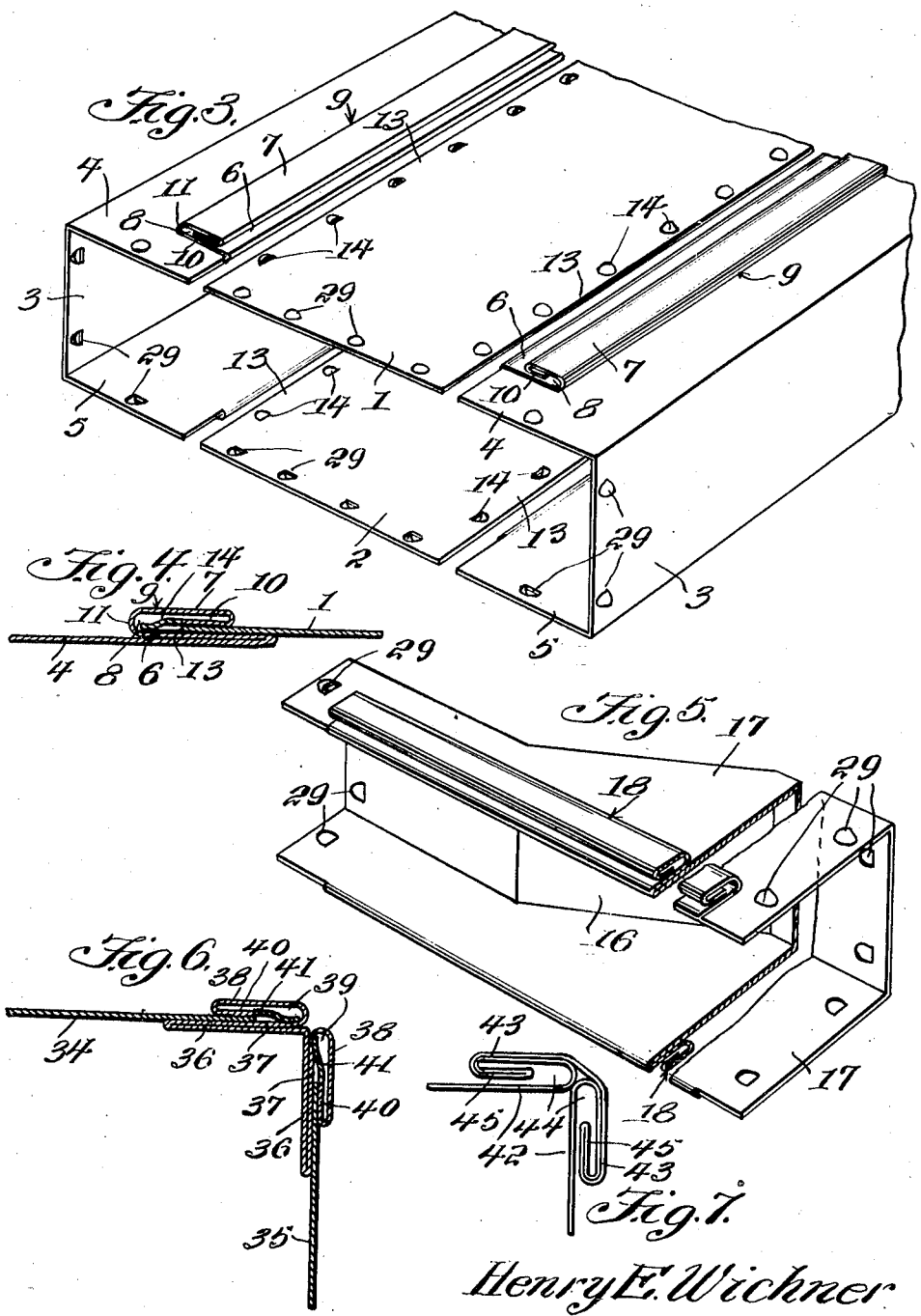

Sept. 28, 1943. H. E. WICHNER 2,330,769
DUST FOR AIR CONDITIONING SYSTEMS
Filed Sept. 3, 1941 3 Sheets-Sheet 3
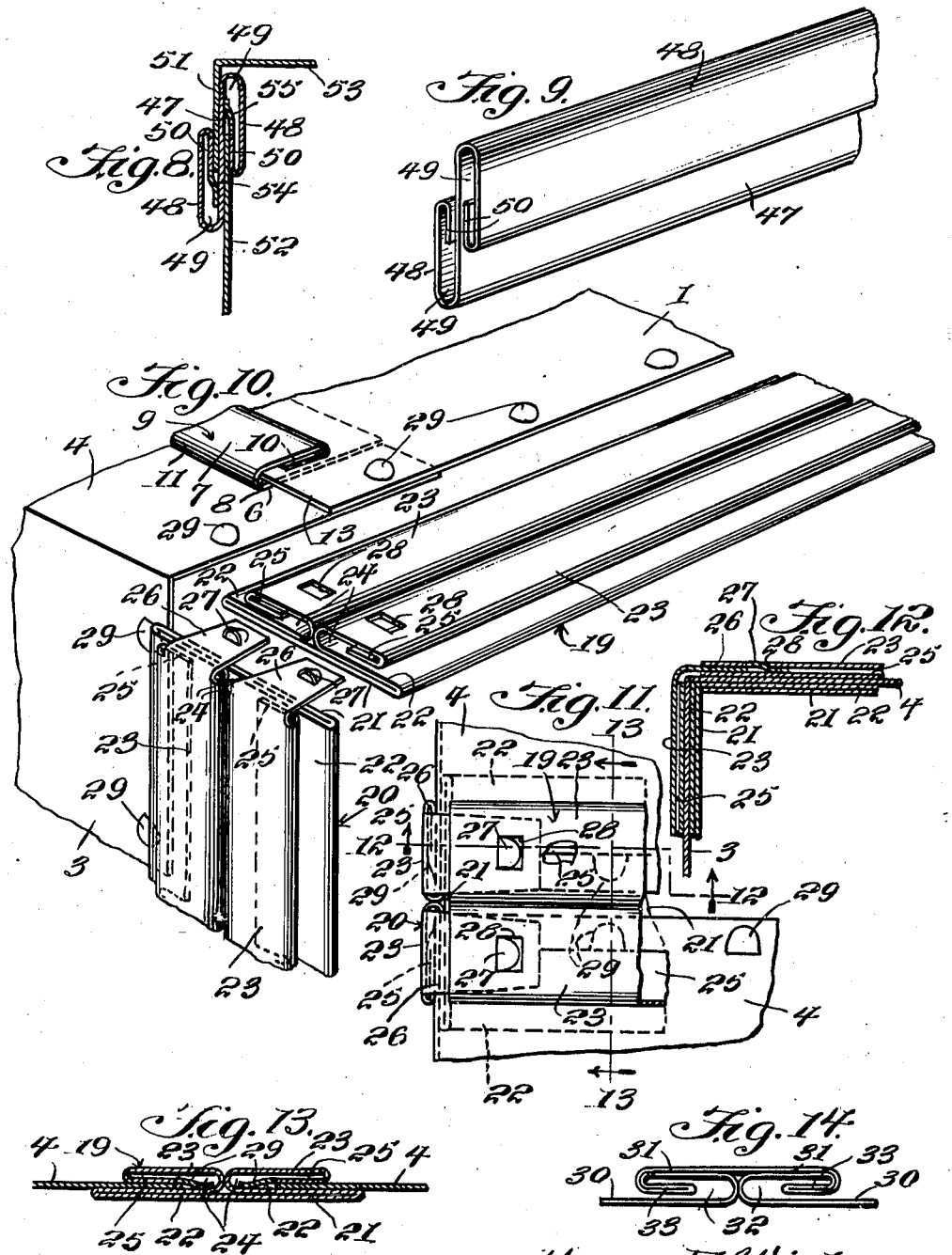
Henry E. Wichner
INVENTOR.
BY Victor J. Evans & Co.

Patented Sept. 28, 1943

2,330,769

UNITED STATES PATENT OFFICE 2,330,769

DUCT FOR AIR CONDITIONING SYSTEMS

Henry E. Wichner, Brookfield Township, Trumbull County, Ohio

Application September 3, 1941, Serial No. 409,427

1 Claim. (Cl. 285—201)

This invention relates to air conditioning systems, and particularly to air ducts and the like therefor, its general object being to provide several different types of duct forming members, and means to facilitate assembling and locking companion members together, in a manner to not only provide a leakproof seam or joint but to prevent any possibility of casual separation or displacement, and the duct forming members and locking means are of such construction, that it is possible to assemble the same to meet substantially all conditions encountered during the installation of ducts in an entire system.

A further object is to provide duct forming members and locking means therefor that can be assembled with minimum effort and by inexperienced mechanics, and are simple in construction, inexpensive to manufacture, as well as render the ducts extremely efficient in use and service.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:

Figure 1 is a perspective view illustrating one form of duct constructed from certain of my members or elements and locking means therefor, there being two main ducts shown, in connection with an air conditioning unit, through the medium of plenum chambers or duct sections.

Figure 2 is a perspective view of a modified form of duct.

Figure 3 is an enlarged fragmentary perspective view illustrating one end portion of a duct section of the form of Figure 1, with the parts separated.

Figure 4 is a sectional view taken approximately on line 4—4 of Figure 1, looking in the direction of the arrows.

Figure 5 is a fragmentary perspective view of one of the side members of a reducing duct section, of the form of Figure 1.

Figure 6 is a sectional view taken approximately on line 6—6 of Figure 2, looking in the direction of the arrows.

Figure 7 is an end view of a modified form of corner locking cleat or joint member for the form of Figure 2.

Figure 8 is a sectional view taken through a modified form of locking cleat which may be used for joining the ends of the duct sections of either of the forms of Figures 1 and 2, but illustrates the same in use for connecting the lower portion of an end duct section of Figure 1, with a plenum chamber or duct section.

Figure 9 is a fragmentary perspective view of the locking cleat of Figure 8.

Figure 10 is an enlarged fragmentary view illustrating the end locking cleats of the form of Figure 1, separated from each other and from the duct forming section members.

Figure 11 is a fragmentary top plan view illustrating the locking cleats of Figure 10, connected to each other and connecting adjacent duct sections together.

Figure 12 is a sectional view taken approximately on line 12—12 of Figure 11, looking in the direction of the arrows.

Figure 13 is a sectional view taken approximately on line 13—13 of Figure 11, looking in the direction of the arrows.

Figure 14 is an end view of a modified form of locking cleat of the type shown in Figures 10 to 13.

Referring to the drawings in detail, and particularly Figure 1, the letter A indicates an air conditioning unit having plenum chamber duct sections secured to and rising therefrom, and the duct sections B have the end sections of main return and outlet ducts C connected thereto, the ducts C being identical and the chamber sections are likewise identical, but the latter sections are formed from members including locking cleats that are different from those of the sections of the ducts C.

The sections of the ducts C are best shown in Figures 3 to 5 and 10 to 13, and first referring to Figure 3, it will be noted that the section of that figure includes a pair of intermediate spaced wall plates or panels 1 and 2 that are superimposed in the arrangement shown, and a pair of side members cooperate with the plates 1 and 2 to form the section. Each of the side members are of substantially U-shape in cross section to provide a side wall portion 3 and parallel or upper and lower wall portions 4 and 5 that are integral with the side wall portion 3.

The plates 1 and 2 may be of any length and width and the same is true with respect to the length of the side members, which have the plates interlocked to the wall portions 4 and 5 thereof, when the members are connected together, as shown in Figure 1. For that purpose, each wall portion 4 and 5 has formed on and along the inner longitudinal edge thereof, a longitudinal locking cleat provided by a flange that is bent outwardly at its juncture with its wall portion to provide an inner rib 6, and from the outer edge of the rib 6, the flange is reversely crimped or folded to provide an outer rib 7 spaced from the rib 6 and overlying the same to provide a channel 8. The flange of this cleat which is broadly indicated by the reference numeral 9, is further folded from the inner longitudinal edge of the rib 7 to provide a locking tongue 10 extending into the channel 8, but having its free edge terminating short of the first fold 11 to provide a space and the tongue 10 is spaced from the rib 6 for that space to receive a longitudinal edge portion 13 of a plate or panel, as best shown in Figure 10, which illustrates that the edge portion 13 is seated in the channel and it is locked therein by substantially semicircular locking lugs 14 struck from the longitudinal edge portion, a considerable distance inwardly of the extreme edge thereof, to bear against the inner or free edge of the tongue 10.

By that construction, it will be obvious that the plates 1 and 2 are locked to the side members against any possibility of casual removal or displacement and the joint thus provided is also leakproof to prevent escape of air. The ribs 6 are relatively wide, and such materially facilitate assembling the parts, in that ample space is provided for the plates to rest upon, prior to inserting the longitudinal edge portions 13 within the channels, as will be apparent upon inspection of Figure 3.

In Figure 1, it will be noted that I have illustrated a reducing section connected to each of the end sections that are connected to the plenum chambers, and each reducing section also includes a pair of intermediate spaced wall plates or panels 15 which of course are of less width than the plates 1 and 2. Each reducing section likewise includes one side member which is identical to those of the section of Figure 3, but the other side member of the reducing section, as best shown in Figure 5, includes a side wall portion 16 of angular formation and parallel or upper and lower wall portions 17 that have their outer edges following the shape of the side wall portion 16. The inner edges of the wall portions 17 have longitudinal locking cleats 18 identical to the cleats 9 of the wall portions 4 and 5, and of course the plates 15 are provided with locking lugs to bear against the locking tongues of the cleats 18, as well as the cleats 9 of the opposite side member of the reducing section for securing the plates 15 within the cleats against casual removal or displacement, as will be apparent upon inspection of Figure 1.

From the reducing sections of the ducts, the remaining sections thereof, at least in the form shown in Figure 1, are of course of less width than the sections that are connected to the plenum chambers, but the narrow sections are constructed from side members, and wall plates, which are locked together by cleats in exactly the same manner, as the plates and wall portions of the wide sections.

The sections of the main ducts of Figure 1 are connected together by transverse locking cleats 19 and 20, each of which includes a strip 21 having its longitudinal edge portions folded back upon themselves to provide inner ribs 22 and outer ribs 23 spaced from the inner ribs to provide channels 24, and the outer ribs 23 have formed thereon locking tongues 25 mounted in the channels 24, as best shown in Figure 10. The folded portions at the juncture of the ribs 22 and 23 are disposed in abutting contact with each other, and the inner ribs engage the body of the strip 21.

The side cleats 20 have ears 26 formed on the outer ribs thereof and bent at right angles thereto and the ears are reduced in width from their juncture with the outer ribs, as well as have substantially semicircular locking lugs 27 struck therefrom to be received in slots 28 disposed in the outer ribs 23 of the cleats 19, as likewise best shown in Figure 10, for securing the cleats together, as shown in Figures 11 and 12. The ends of the wall plates and wall portions of the duct sections also have locking lugs 29 similar to the lugs 27 and 14, struck therefrom, and the lugs 29 are receivable in the channels 24 to abut against the inner longitudinal edges of the locking tongues 25, for securing the ends of the sections together against casual removal or displacement, as well as to provide a leakproof joint or seam, as will be apparent.

In Figure 14 I have illustrated a slightly modified form of transverse locking cleat for connecting the ends of the sections together and this form is likewise made from a single strip to provide pairs of inner ribs 30 and outer ribs 31 spaced from the inner ribs to provide channels 32, and the outer ribs 31 are likewise formed with locking tongues 33 mounted in the channels 32. In this form of cleat the outer ribs, as well as the locking tongues 33 are provided with a double layer of material due to the manner of folding the strip and the outer layer of the ribs 31 bridge the fold portions at the juncture of the companion ribs with each other. Otherwise the cleat of Figure 14 is identical to the cleats 19 and 20 and function in exactly the same manner.

The modified form of duct D of Figure 2 is made up of elongated sections, but of course it will be understood that the sections can be of any length as previously indicated, and each of the sections of that form include upper and lower wall plates or panels 34 and relatively narrow side wall plates or panels 35 that have their longitudinal edge portions locked to the longitudinal edge portions of the plates 34 by corner locking cleats, as best shown in Figure 6. Each corner locking cleat is made from a single strip bent along its longitudinal center to provide right angle portions 36 that are folded or crimped throughout the length thereof to provide inner ribs 37 and from the ribs 37 the portions 36 are folded to provide outer ribs 38 spaced from the inner ribs 37 to provide channels 39. The outer ribs 38 have locking tongues 40 formed on the outer longitudinal edges thereof, and the tongues 40 are mounted in the channels 39 to receive substantially semicircular locking lugs 41 that are struck from the longitudinal edge portions of the plates 34 and 35, so that these plates are connected together against casual removal or displacement, as well as to provide a joint that is leakproof, as will be apparent upon inspection of Figure 6.

A modified form of corner locking cleat is shown in Figure 7, and this form is likewise made from a single strip to provide right angle portions 42 that constitute the inner ribs, while the outer ribs are indicated by the reference numeral 43 and are spaced from the portions or ribs 42 to provide channels 44 for receiving the longitudinal edge portions of the plates 34 and 35. Formed on the outer ribs 43 are locking tongues 45 that are mounted in the channels to be engaged by the locking lugs 41. The locking tongues 45, as well as the outer ribs 43 include a double layer of material, and the outer layer of the outer ribs 43 bridge the folded portions at the juncture of the outer and inner ribs with each other, as shown, and the folded portions are disposed in contacting engagement.

The sections of the duct of Figure 2 are shown as having their ends connected together by transverse locking cleats, identical to those of the cleats shown in Figure 10, and of course the end portions of the plates 34 and 35 must necessarily have locking lugs 46 struck therefrom to be received by the tongues 25 of the cleats 19 and 20.

However, the sections of the duct of Figure 2 may have their ends connected together by substantially cross-sectional S-shaped locking cleats of the form as best shown in Figure 9, and this form is made from a single strip folded to provide outer ribs 48 and inner tongues 50, the ribs being disposed upon opposite sides of the body, to provide channels 49 having the tongues 50 mounted therein and spaced from the ribs, as well as the body 47 for receiving the locking lugs 46 at the ends of the duct sections, for connecting the latter together in a leakproof manner, and of course against casual separation or displacement.

It will be noted, as best shown in Figures 2 and 3 that the longitudinal locking cleats terminate inwardly of the ends of the sections a sufficient distance, to allow ample space to receive the transverse locking cleats.

It will be obvious from Figure 1 that the lower wall portion 2 and the lower wall portions 5 of each of the sections which are directly connected to the plenum chambers are formed to provide an opening for direct communication between those sections and the chambers, and a depending flange 51 is formed about the opening. The plenum chambers are in fact duct sections and each are formed by side and end wall plates 52 and 53 respectively which are connected together along their vertical edges by either form of corner cleat of Figures 6 and 7. The cross-sectional S-shaped cleats of Figures 8 and 9 act to connect the upper edges of the side and end wall plates 52 and 53 to the marginal flange 51, and the lower edges of the plates 52 and 53 are inserted within openings provided in the top wall of the unit A. It will be obvious that the plates 52 and 53 are each provided with locking lugs 54 to be received by the locking tongues 40 or 45 of the corner cleats, and the locking tongues 50 of the cross-sectional S-shaped cleats. The flange 51 is provided with locking lugs 55 to be received by the locking tongues 50.

While all of the duct sections shown include straight members and locking means therefor, it will of course be necessary to provide some curved or elbow sections, and the latter sections will include locking cleats similar to those of the sections shown, for cooperation with locking lugs of the type shown, for locking the respective members of the elbow sections together.

While all of the wall forming members together with the locking cleats therefor may be prefabricated at the factory and shipped on a job to be assembled, it is desirable in practice that only the separate locking cleats of each of the forms shown and the side members as best shown in Figures 3 and 5, without the locking lugs, be made at the factory, so that those members and cleats, with the latter in long lengths, together with bundles of sheet metal can be shipped on a job for the installation mechanics to make any size duct section required, in that the sheets of metal and separate cleats can be cut to the desired size and length and the members can be punched to provide the locking lugs during the assembling of the sections and ducts, thus assuring proper fitting of the ducts relative to the building walls in which the system is being installed as well as a saving in time and labor.

It has been stated that my ducts are designed for air conditioning systems, but it will be obvious that they can be used in any type of cooling and/or heating system, or for any other suitable purpose.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

In a duct including sections, locking cleats for detachably securing the sections to each other, each cleat being formed from a strip folded reversely along its length to provide a body and a pair of inner ribs engaging the outer face of the body, outer ribs formed on the inner ribs and overlying the same to provide channels receiving the edge portions of the sections, tongues formed on the outer ribs and mounted in the channels in contact with the outer faces of the sections, substantially semicircular locking lugs formed on the sections and mounted in the channels in edge to edge contact with the tongues, the outer ribs of certain strips having slots adjacent the ends thereof, ears formed on the ends of the outer ribs of the remaining strips and mounted in the channels of companion strips between the tongues and outer ribs, and locking lugs formed on the ears and mounted in the slots for securing the cleats to each other.

HENRY E. WICHNER.